Figure 1:
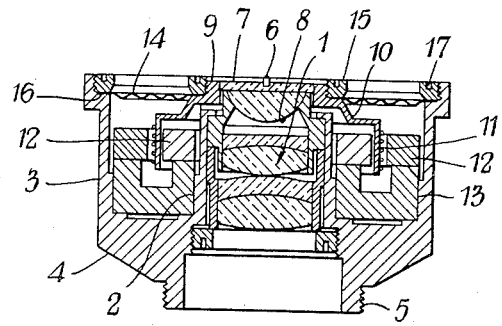

Feb. 11, 1964    J. R. GREEN ET AL    3,120,753
MECHANISMS APPLICABLE TO HARDNESS TESTING
Filed April 14, 1960    4 Sheets-Sheet 1

Feb. 11, 1964  J. R. GREEN ET AL  3,120,753
MECHANISMS APPLICABLE TO HARDNESS TESTING
Filed April 14, 1960  4 Sheets-Sheet 2

Feb. 11, 1964   J. R. GREEN ET AL   3,120,753
MECHANISMS APPLICABLE TO HARDNESS TESTING
Filed April 14, 1960   4 Sheets-Sheet 3

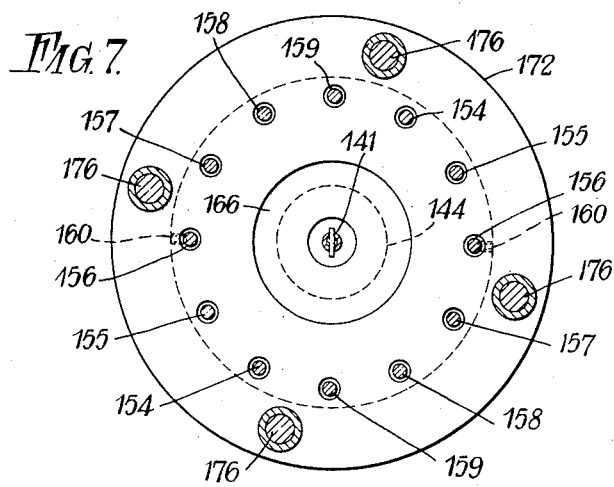
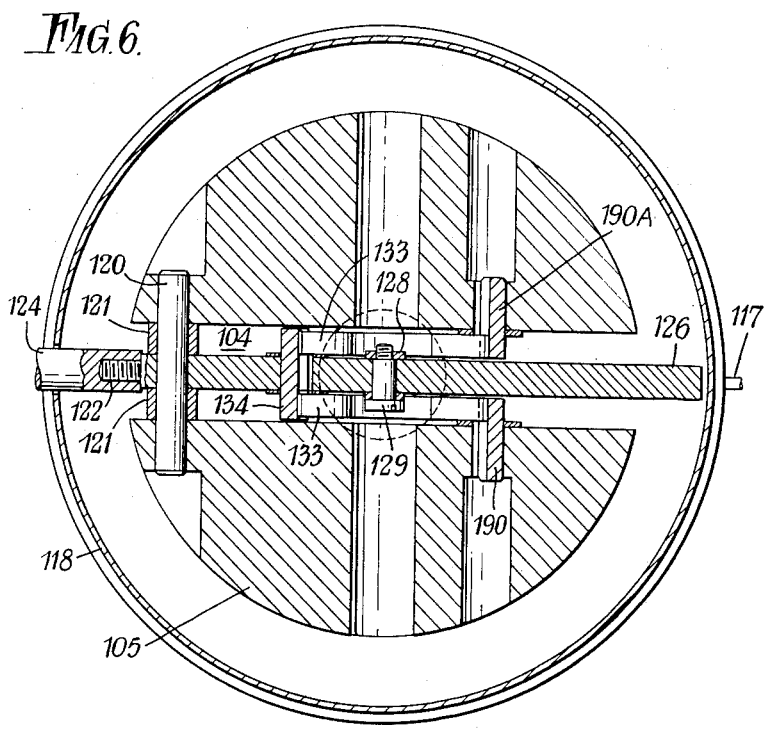

United States Patent Office 3,120,753
Patented Feb. 11, 1964

3,120,753
MECHANISMS APPLICABLE TO HARDNESS TESTING
Jack Raymond Green and Karl Goitein, London, England, assignors, by mesne assignments, to Vickers Instruments Limited, York, England, a British company
Filed Apr. 14, 1960, Ser. No. 22,285
Claims priority, application Great Britain Apr. 24, 1959
18 Claims. (Cl. 73—81)

This invention relates to mechanisms applicable to hardness testing, and is concerned with mechanisms applicable to hardness testing by indentation. The hardness testing of materials by indentation involves the production of an indentation in the surface of a specimen to be tested, by the application thereto, under the action of a positive load, of a hard tool of accurately defined shape and hardness known as an indenter. The hardness of the material can then be calculated in terms of the area of the indentation and the magnitude of the load applied to the indenter to produce that indentation.

In practice the most common type of indenter employed is either a hardened steel ball or a square base diamond pyramid. Other forms of indenter may however equally well be employed.

The present invention is particularly concerned with the micro-hardness testing of materials, that is the hardness testing of materials where comparatively small loads are applied to the indenter and in consequence small areas of indentation are produced. Such micro-hardness testing is of particular importance in the measurement of the hardness of a specimen where only a relatively small area of the specimen is available for testing or where the specimen itself is in the form of a very thin sheet or strip. It will be appreciated that the nature and form of the specimen in such cases, of necessity introduces an upper limit into the possible area of indentation which can be produced and to the maximum load which can be applied to the indenter.

In view of the relatively low loads involved and of the small areas of indentation produced, it is particularly desirable that the magnitude of the load employed should be accurately determined and that the area of indentation should be readily and accurately calculable. It is furthermore highly desirable, in order to reduce, as far as possible, sources of error in the determination of the hardness of such specimens, that contact between the indenter and the specimen leading to the production of the indentation, should as far as possible be impact-free.

According to the invention there is provided in micro-hardness testing apparatus, a mechanism comprising a microscope objective adapted to form part of a microscope for measuring an indentation to be made in a test specimen, an indenter disposed adjacent to said objective and substantially on the optical axis thereof, flexible means inter-connecting said indenter and objective and freely permitting movement of said indenter relative to said objective substantially only along said optical axis, and means for applying a predetermined load to said indenter to cause the same to produce an indentation in a test specimen maintained in fixed relation to said objective.

Said indenter may be associated with electromagnetic means, which, upon actuation, applies a predetermined load to said indenter, so as to move it along said axis towards and against a specimen whose hardness is to be tested.

Alternatively said apparatus may be associated with a pneumatic load generating mechanism which upon actuation generates and applies a predetermined pneumatic load to said indenter so as to move it along said axis towards and against a specimen.

Figure 2:
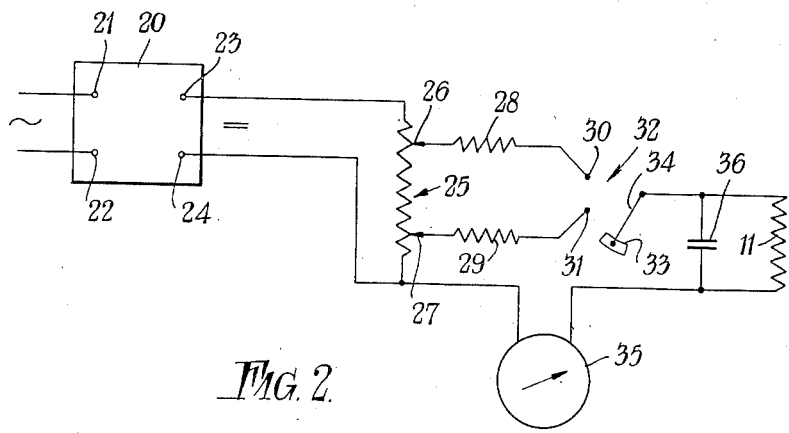
Figure 3:
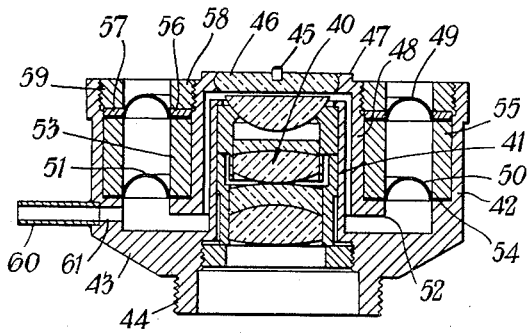
Figure 4:
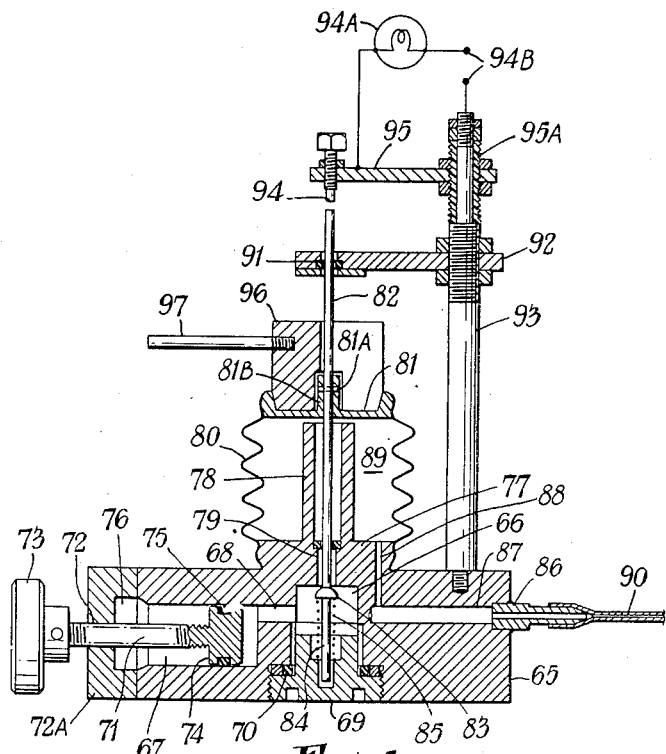
Figure 5:
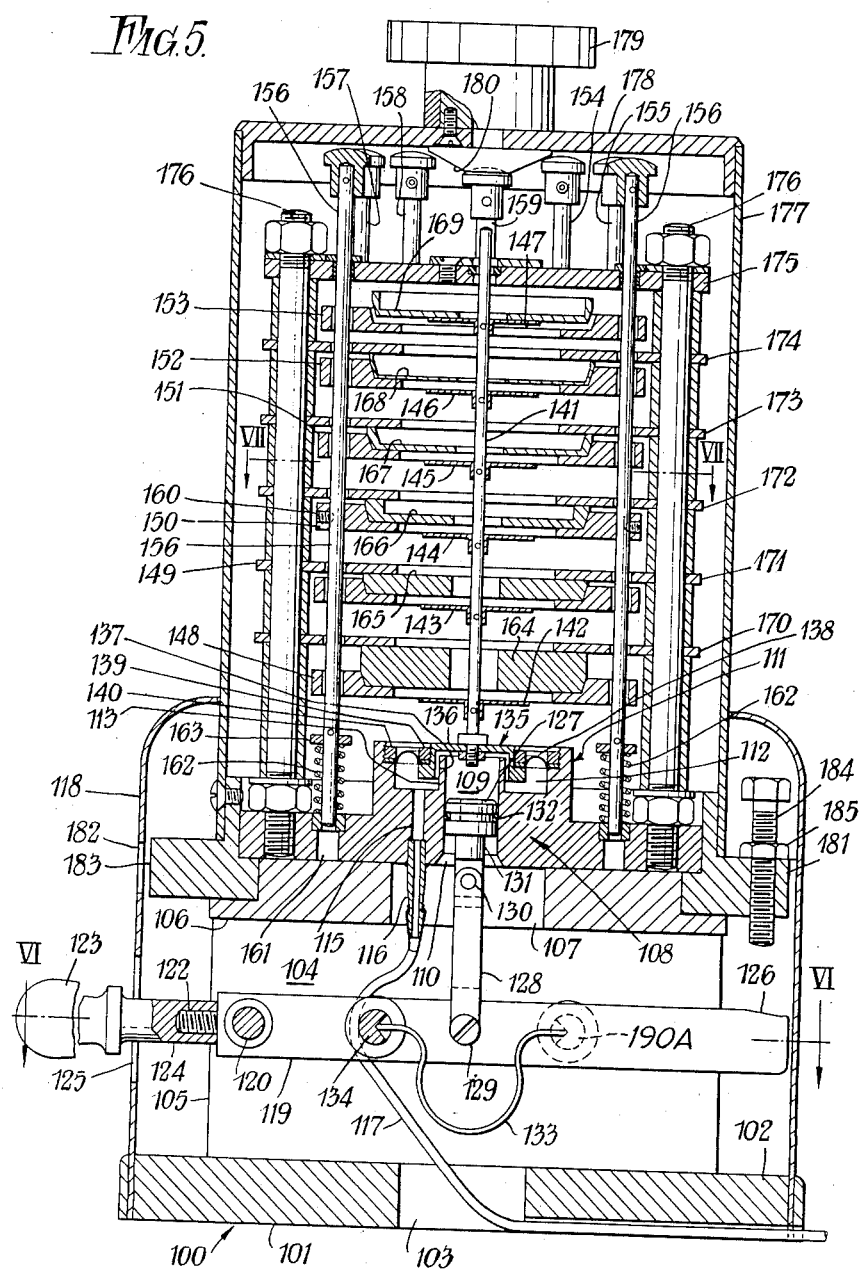

For a better understanding of the invention and to show how the same may be carried into effect reference will now be made to the accompanying drawings, in which:

FIGURE 1 is a longitudinal sectional elevation of part of an electro-magnetically operated micro-hardness testing apparatus in accordance with the present invention and comprising a microscope objective and indenter mounting, FIGURE 2 is a schematic circuit diagram of an electrical control circuit employed in conjunction with the apparatus shown in FIGURE 1, FIGURE 3 is a longitudinal sectional elevation of part of a pneumatically operated micro-hardness testing apparatus in accordance with the present invention and comprising a microscope objective and indenter mounting, FIGURE 4 is a longitudinal sectional elevation of a first form of a mechanism for generating a pneumatic load in accordance with the present invention and suitable for use in conjunction with the apparatus shown in FIGURE 3, FIGURE 5 is a similar view of a second form of a mechanism for generating a pneumatic load in accordance with the present invention and suitable for use in conjunction with the apparatus shown in FIGURE 3, and FIGURES 6 and 7 are sectional views of the mechanism shown in FIGURE 5 and taken respectively along the lines VI—VI and VII—VII.

Referring to FIGURE 1 of the drawings, a conventional microscope objective has an optical lens system 1 and is located in an inner objective housing 2 which is formed integrally and co-axially with an outer objective housing 3 surrounding the inner housing 2. The outer and inner housings 3 and 2 are integrally connected at their bases to form a common base 4, which common base terminates in an externally threaded sleeve 5 arranged for screwthreaded connection to the remainder of a microscope (not shown).

A diamond pyramid indenter 6 is embedded in a central portion of an optically flat plate glass disc 7 which, as shown in the drawings, rests on an objective lens 8, the indenter 6 lying in the optical axis of the objective. The plate disc 7 is cemented around its edge to a ring shaped carrier 9. The ring carrier 9 has, at its lower edge, an outwardly directed stepped flange 10, there being secured to the outermost peripheral portion of the flange 10 a moving coil 11 disposed parallel to the ring carrier 9. The coil 11 projects into an annular air gap formed between ring-shaped pole pieces 12 of a permanent ring magnet 13 disposed in the annular space between the inner and outer housings 2 and 3.

The inner edge of an annular flexible diaphragm 14 is secured to the ring carrier 9 by being clamped against the immediately adjacent portion of the flange 10 by means of an internally threaded ring nut 15 which is screwed onto an externally threaded portion of the ring carrier 9. The outer edge of the diaphragm 14 is secured to the periphery of the outer housing 3 by being clamped against an inwardly directed shoulder 16 formed adjacent the mouth of the housing 3 by means of an externally threaded ring nut 17 screwed into an internally threaded portion of the mouth of the housing 3.

Constructed and mounted as described above the indenter 6 is displaceable with respect to the objective, the displacement of the indenter being effected by displacing the carrier ring 9 with its flange 10, there being appropriate clearance between the ring 9 and the part of the objective which it encircles. Due to the particular way in which the indenter 6 is mounted relative to the objective housings and the nature of the resilient diaphragm 14, the displacement of the indenter 6 can take place substantially only along the optical axis of the objective whilst movement of the indenter 6 in directions transverse to this axis is substantially prevented.

In operation the indenter 6 is arranged to move along the optical axis of the objective towards a specimen to be tested (not shown), which specimen is suitably clamped on a stage (not shown). Contact between the indenter and the specimen takes place through a suitable aperture formed in the stage.

The indentation thereby effected can then be directly inspected utilising the microscope and a characteristic dimension of the indentation measured. This latter measurement enables the calculation of the area of indentation to be made, and the hardness of the specimen can then be expressed in terms of the load required to produce a unit area of indentation. The calculation of the area can be readily and accurately effected. The ultimate accuracy of measurement of the hardness will therefore depend upon the accuracy with which the magnitude of the applied load is known.

As has been indicated above it is highly desirable to ensure that the load is so applied to the indenter as to cause it to make a substantially impact-free contact with the specimen.

The satisfying of this requirement is aided to a considerable degree by the fact that as described with reference to FIGURE 1 of the drawings and as will be described with reference to FIGURE 3 of the drawings, the indenter and its mounting are of a relatively light weight as compared with the weight of the objective as a whole and that the indenter is substantially freely displaceable with respect to the objective.

Referring to FIGURE 1, the load to be applied to the indenter so as to cause it to move towards the specimen and to press against the specimen with a predetermined force arises out of the flow of a predetermined electric current through the moving coil 11. It is highly desirable that the magnitude of the force and hence the magnitude of the electric current flowing through the coil should be accurately predetermined and that contact between the indenter and the specimen should be subject to minimum impact. FIGURE 2 of the drawings illustrates schematically a suitable electric circuit whereby an accurately predetermined current may be caused to flow in the moving coil 11 and the application of this current takes place in such a way as to reduce still further the dangers of impact between the indenter and the specimen.

Referring to FIGURE 2, a rectifying and voltage stabilising arrangement 20 has input terminals 21, 22 connected to a source of alternating voltage, and also has unidirectional voltage output terminals 23, 24 connected to the respective ends of a potential divider 25. The potential divider 25 is provided with two sliders 26 and 27 which are respectively connected via resistors 28 and 29 to two fixed contacts 30 and 31 of a three-position switch 32, the third fixed contact 33 of which serves only to locate a movable switch arm 34 in an "off" position for the switch. The arm 34 is also connected to one end of the moving coil 11, the other end of the coil 11 being connected via a specially calibrated current meter 35 to the output terminal 24 of the arrangement 20, and to the other end of the potential divider 25. A capacitor 36 is connected in parallel with the moving coil 11.

In operation of the apparatus shown in FIGURE 1 and of its associated electrical control circuit shown diagrammatically in FIGURE 2, the arm 34 is moved from the "off" position shown so as to engage the fixed contact 31, the slider 27 having been so adjusted that just sufficient current flows through the moving coil 11 to lift the indenter and its associated mounting from the rest position illustrated in FIGURE 1 to a position where the indenter engages the specimen with a negligible contact pressure. Thereafter the arm 34 is moved so as to engage the contact 30 associated with the slider 26.

The magnitude of the current flowing through the moving coil 11 via the slider 26 is chosen so that the indenter is now forced against the specimen (not shown) with a predetermined pressure of contact. The current meter 35 is so calibrated as to be capable of giving a direct reading in terms of the load applied to the indenter so as to achieve this pressure. Thus variation of the position of the slider 26 results in a variation of the current flowing through the coil 11 and a corresponding variation in the pressure obtaining between the indenter and the specimen. The provision of the capacitor 36 ensures that a delay is introduced in the build-up of the current in the coil 11 and that in consequence contact between the indenter and the specimen is rendered substantially impact free. Thus utilising the arrangements shown in FIGURES 1 and 2 of the drawings the indenter can be forced against the specimen with a pressure of indentation which can be accurately predetermined and so applied as to ensure substantially impact-free contact.

Referring to FIGURE 3 of the drawings, a microscope objective has an optical lens system 40 similar to the lens system 1 illustrated in FIGURE 1 of the drawings. The lens system 40 is located and mounted in an inner objective housing 41 which is formed integrally and coaxially with an outer objective housing 42. The outer housing 42 and the inner objective housing 41 are integrally connected at their bases to form a common base 43, which common base 43 terminates in an externally threaded sleeve 44 arranged for screw-threaded connection to the remainder of a microscope (not shown).

A diamond pyramid indenter 45 is embedded in a central portion of an optically flat plate glass disc 46. The disc 46 is cemented around its edge to the inner periphery of an inwardly directed flange 47 formed at an upper end of a cylindrical carrier sleeve 48. The carrier sleeve 48 and its associated disc 46 and indenter 45, are mounted with respect to the outer housing 42 by means of a pair of annular rubber diaphragms 49 and 50. Each of the annular diaphragms 49 and 50 has an inwardly and outwardly directed annular flange and an annular curved intermediate portion of substantially semi-circular cross-section. In the case of the diaphragm 50 this intermediate curved section is provided with spaced apertures 51. The inwardly directed flanges of the diaphragms 49 and 50 are respectively secured to the carrier sleeve 48 as follows: The inwardly directed flange of the diaphragm 50 is disposed on an outwardly directed flange 52 formed at the end of the carrier sleeve 48 remote from the inwardly directed flange 47 thereof. A cylindrical spacer sleeve 53 is arranged to surround the carrier sleeve 48, the lower end of the spacer sleeve 53 resting on the inwardly directed flange of the diaphragm 50. The outwardly directed flange of the diaphragm 50 is arranged to rest on a shoulder 54 formed in the inner wall of the outer housing 42 adjacent the common base 43. An outer cylindrical spacer sleeve 55 is fitted inside the outer housing 42 so as to be intimately surrounded thereby, the lower end of the spacer sleeve 55 resting upon the outwardly directed flange of the diaphragm 50. The inwardly and outwardly directed flanges of the diaphragm 49 are respectively arranged to rest on the upper end faces of the spacer sleeves 53 and 55. Ring washers 56 and 57 respectively bear against the upper surfaces of the inwardly and outwardly directed flanges of the diaphragm 49. The entire diaphragm mounting arrangement is secured in position by means of internally and externally threaded ring nuts 58 and 59. The nut 58 is screwed onto an externally threaded upper end portion of the carrier sleeve 48, the lower end face of the nut 58 bearing against the ring washer 56. Similarly the nut 59 is screwed into an internally threaded end portion of the outer housing 42, the lower end face of the nut 59 bearing against the ring washer 57. An air inlet tube 60 is secured to the outer housing 42 at a position adjacent the base 43 thereof and communicates with the interior of the housing via an aperture 61 formed in the walls of the outer housing.

Constructed and mounted as described above the indenter 45 and its associated mountings 46 and 48 are displaceable with respect to the microscope objective. By virtue of the mounting of the carrier sleeve 48 with respect to the outer housing 43 by means of the two superposed flexible diaphragms 49 and 50, displacement of the indenter 45 can take place substantially only along the longitudinal optical axis of the objective whilst movement of the indenter in directions transverse to this axis is substantially prevented.

In operation, the indenter 45 is caused to move along the longitudinal optical axis of the objective towards a specimen to be tested (not shown) which specimen is suitably clamped into a stage (not shown). Contact between the indenter 45 and the specimen takes place through a suitabel aperture formed in the stage.

The load to be applied to the indenter so as to cause it to be moved towards the specimen and to press against the specimen with a predetermined pressure of contact arises out of the application of a predetermined pneumatic load to the indenter through the inlet pipe 60. In order to ensure that the magnitude of the pressure of contact between the indenter and the specimen is accurately controlled and known and that contact between the indenter and specimen is subject to minimum impact, the magnitude and nature of the pneumatic load to be applied to the indenter must be accurately predetermined. This latter danger of impact is reduced by ensuring that the pneumatic load is applied to the indenter through a suitable constriction. This is achieved by passing air at a predetermined pressure into the inlet tube 60 via a suitable capillary tube. Thus, the provision of such a capillary tube ensures that even where the pneumatic load is abruptly and suddenly initiated, there is only a gradual build-up of the load on the indenter because of the intervening resistance to gas flow introduced by the presence of the capillary tube.

In the use, however, of a pneumatically operated indenter as illustrated in and described with reference to FIGURE 3 there still remains the problem of ensuring that accurately predetermined pneumatic indenting loads are applied to the indenter. The solution to this problem involves the provision of a supply of air and means for accurately controlling and determining the pressure of the air supply.

Referring to FIGURE 4 of the drawings there is here illustrated a pneumatic load generating and transmitting mechanism which allows for the supply of compressed air at accurately predetermined pressures, which pressures may readily be varied. The mechanism comprises a main housing 65 having formed therein a bore 66 and a second transverse bore 67, the latter communicating at one end with the bore 66 through a duct 68. The lower end of the bore 66 is sealed by means of an externally threaded plug 69 screwed into a correspondingly threaded countersunk portion of the lower end of the bore 66. A sealing ring 70 is interposed between an outwardly directed flange of the plug 69 and an adjacent shoulder formed by the countersunk portion of the bore 66. A screw-threaded rod 71 is screwed through a tapped aperture 72 formed in an end cap 72A which closes the bore 67. The rod 71 has secured to one end thereof a turning knob 73 and to the other end thereof a plunger 74 provided with a sealing ring 75. The cap 72A has a recess 76 formed therein and registering with a belled-out end of the bore 67, such recess being of greater diameter than the bore 67, so that when the plunger 74 and sealing ring 75 are disposed in this recess 76, air can leak through the tapped aperture 72 and hence the bore 67 can communicate with the surrounding atmosphere.

Formed integrally with the upper face of the housing 65 is a shallow substantially cylindrical boss 77, and projecting upwardly from the boss is a tubular extension 78, the bore of which communicates with the bore 66 via a duct 79 formed in the boss 77.

A flexible tubular bellows 80 is secured at the lower end thereof around the boss 77 and at the upper end thereof to a centrally apertured weight-bearing platform 81. An elongated spindle 82 passes through the central aperture in the platform 81 and is rigidly secured by a pin 81A in a gland 81B formed on the platform 81, the connection between the spindle 82 and the platform 81 being air-tight. The spindle 82 passes through the tubular extension 78 and the duct 79 and carries at its lower end a hemispherical valve body 83 disposed adjacent a seating formed at the lower end of the duct 79. Secured to the lower end of the hemispherical valve body 83 is a locating rod 84, the lower end of the rod 84 being located in a centrally disposed well formed in the plug 69. A compression spring 85 surrounds the elongated extension 84 and bears at the upper end thereof against the valve body 83 and at the lower end thereof on a shoulder formed in the walls defining the well in the plug 69. The compression spring 85 therefore serves to bias the valve body 83 against its seating.

An air outlet nipple 86 is mounted in the housing 65 and communicates via a conduit 87 and a small bore duct 88, both formed in the walls of the housing, with an air compression chamber 89 bounded by the bellows 80, the platform 81 and the upper surface of the boss 77. Capillary tubing 90 is connected to the nipple 86, the other end of the tubing 90 being arranged for connection to the air inlet 60 of the arrangement shown in FIGURE 3.

The upper end portion of the spindle 82 passes through and is located in a bearing 91 formed in a bracket 92 which is in turn mounted on a vertical support pillar 93, which support pillar is screwed into the housing 65. An electrical contact 94 is mounted on a bracket 95 which is in turn mounted on the vertical support column 93 through the intermediary of an electrically insulating sleeve 95A. The contact 94 is connected in a diagrammatically shown circuit which includes a signal lamp 94A and a pair of supply terminals 94B, the arrangement being such that contact between the upper tip of the spindle 82 and the contact 94 takes place when the valve body 83 is pressed against its seating, this contact resulting in the closing of the circuit and the illumination of the lamp 94A.

A slotted weight 96 provided with a suitable gripping handle 97 rests on the platform 81. It will be appreciated that slotted weights of differing masses may be so disposed on the platform 81.

In the operation of this mechanism for the generation of a pneumatic load the knob 73 is so rotated as to cause the plunger 74 with its associated sealing ring 75 to move into the enlarged portion 76 at the end of the bore 87. In consequence the bores 67 and 66 and the chamber 89 communicate with the atmosphere via the threaded aperture 72, and the weight-bearing platform under the load of the weight 96 rests on the upper edge of the tubular extension 78. The knob 73 is then rotated in the opposite sense, causing the plunger 74 to move into the bore 67 and, once the sealing ring 75 enters the bore 67, the portion of the bore 67 to the right of the sealing ring, and also the bore 66 and chamber 89, are sealed from the atmosphere. Continued inward movement of the plunger 74 results in compression of the air in the right-hand portion of the bore 67, in the bore 66, and in the chamber 89. After a certain amount of compression has taken place the force exerted by the compressed air in the chamber 89 on the under surface of the platform 81 equals the downward force exerted by the weight 96 on the upper surface of the platform 81, and upon further inward movement of the plunger 74 and consequent further compression of air in the chamber 89, the platform 81 and weight 96 are upwardly displaced. This upward displacement of the platform 81 is accompanied by an equivalent upward displacement of the valve body 83. The inward movement of the plunger 74 is continued until the platform 81, weight 96 and spindle 82 have been displaced upwards to such an extent that the valve body 83 is firmly pressed against its seating thereby sealing off the air in the chamber 89 from further compression. At this instant the upper tip of the spindle 82 engages the contact 94 thereby causing the signal lamp 94A to be illuminated. Thereafter the operator turns the knob 73 to cause a small further inward movement of the plunger 74, so raising the pressure in the bore 66 a little above that in the chamber 89. The pressure of the air in chamber 89 is directly related to the mass of the weight 96 and is also related to the resistance to expansion of the flexible bellows 80. It will be appreciated however that provided the extent of expansion of the bellows 80 is always the same irrespective of the mass chosen for the weight 96, the influence of such resistance to expansion upon the magnitude of the pressure in the chamber 89 can be readily allowed for, as in all cases this resistance has a constant ascertainable value.

The compressed air in the space 89 gradually leaks away through the capillary tubing 90 and results, when the capillary tubing 90 is connected to the inlet tube 60, in the application to the indenter 45 of a load which bears a direct relationship to the pressure of compressed air in the chamber 89. As the compressed air in the chamber 89 leaks away through the tubing 90 the weight-bearing platform 81 starts to sink down, but in so doing displaces the valve body 83 from its seating, and air is thus admitted to the chamber 89 from bore 66 which contains air at a pressure a little above that in chamber 89. As soon as the platform 81 rises under the slight increase in pressure caused by the admission of air from the bore 66, the valve body 83 returns to its seating. This process continues until the pressures in the chamber 89 and that acting on the indenter connected to it by the capillary tubing 90 are equalised, so that no further flow out of chamber 89 takes place.

Provided that the inward movement of the plunger 74 is carried out in the manner described above, the expansion of the bellows 80 when pressure equalisation has been reached, will be such that the valve body 83 is upon its seating so that the effect on the pressure in chamber 89, and thus on the indenter, of the resistance to expansion of the bellows, will be the same for all cases and this resistance can be allowed for by adding a fixed amount to the magnitude of the weight 96.

With such a pneumatic load generator and transmitter the effective load generated and transmitted to the indenter is that static load required to balance a weight of predetermined mass disposed on a flexible diaphragm. It will thus be appreciated that transient thermo-dynamic effects will not materially influence the magnitude of air pressure transmitted. Furthermore variations in the atmospheric air pressure will only have a slight and negligible effect on the magnitude of the ultimate air pressure transmitted. As already noted, the upward displacement of the bellows always takes place to a predetermined extent and hence the resistance to this displacement due to the bellows itself will be independent of the mass of the weight disposed on the bellows, and will always form a constant factor in the magnitude of the air pressure transmitted. Thus the magnitude of the air pressure transmitted will depend directly only on the mass of the weight disposed on the bellows.

As will be appreciated, the efficiency of operation and degree of accuracy achieved with the pneumatic generator described depends to a large extent upon whether the operator correctly produces the necessary further compression of air by inward movement of the plunger 74 for a short distance just after the signal lamp 94A has been illuminated. If the further compression is carried out to an extent which is too great, then the replenishment of air in the chamber 89 can occur too violently, thus disturbing the transmitted air pressure. If, on the other hand, the further compression is carried out only to a negligible extent, the replenishment may be ineffective. It will thus be appreciated that, where extreme accuracy of measurement is required, this is limited by the possibility of human errors of judgment in the operation of the mechanism.

There will now be described with reference to FIGURES 5, 6 and 7 of the drawings, a mechanism for generating a pneumatic load wherein the possibilities for human errors of judgment are substantially reduced. In this mechanism, as in the mechanism described above with reference to FIGURE 4, the magnitude of the air pressure generated and transmitted is determined by the pressure required to balance a weight of predetermined mass disposed on a flexible diaphragm. In this mechanism, however, means are provided for ensuring that compression of air can never take place beyond that degree required to displace the diaphragm by a predetermined amount. Furthermore, this mechanism is provided with means whereby weights of different masses can successively and selectively be disposed on the diaphragm, there being a simultaneous adjustment of the means limiting the compression of air.

Referring to FIGURES 5 to 7 of the drawings, the mechanism comprises a cylindrical base member 100 having an end portion 101 with an outwardly directed annular flange 102, the end portion 101 being formed with a central aperture 103 which communicates with a transverse slot 104 formed in a main body portion 105 of the base member 100. An upper portion 106 of the base member 100 has a central cylindrical aperture 107 coaxial with the aperture 103 and communicating with the interior of the slot 104.

Disposed on, and rigidly secured to, the upper portion 106 is a compression chamber housing 108. The compression chamber housing 108 is provided with a central cylindrical bore constituting a compression chamber 109, the lower end 110 of which is outwardly flared and communicates with the aperture 107. The chamber 109 extends through an upwardly directed cylindrical boss 111 formed integrally with the housing 108, an annular groove 112 being formed in the boss 111 so as co-axially to surround the chamber 109 and to be separated therefrom by an annular wall 113 of the chamber 109. A duct 115 is formed in the housing 108 and the boss 111 and communicates at one end with the groove 112 and at the other end with a pipe 116 set into the duct 115 and passing through the aperture 107. Capillary tubing 117 is secured to the end of the pipe 116 remote from the duct 115, and passes through the slot 104 and the aperture 103 out of the housing and to an indenter such as described with reference to FIGURE 3.

A cylindrical outer shell 118 surrounds the base member 100 and the compression chamber housing 108, and is secured at its lower edge to the outward flange 102 of the end portion 101. An elongated rod-like lever 119 is pivotally mounted in the slot 104 upon a pivot pin 120, the ends of which are set in the adjacent walls of the slot 104. The lever 119 is spaced from the adjacent walls by means of a pair of sleeves 121 which are fitted on the pivot pin 120. The lever 119 has a screw-threaded tang 122 entered in an operating handle 123, the neck 124 of the handle 123 passing through a slot 125 formed in the adjacent portion of the shell 118. The end 126 of the lever 119 remote from the handle 123 extends almost up to the wall of the shell. The lever 119 is coupled at an intermediate position thereon to a plunger 127 located in the chamber 109 by means of a link 128, the latter having bifurcations at each end. One bifurcated end of the link is secured by a pivot pin 129 to the lever 119, and the other by a pivot pin 130 to a plunger rod 131 of the plunger 127. The plunger 127 is provided with a sealing ring 132.

The angular position of the lever 119 with respect to the pivot pin 120 is controlled by a pair of circularly bent compression leaf springs 133 one end portion of each spring 133 being located in a knife-edge bearing 134 mounted in and passing through the lever 119, the other end of each spring 133 being located in respective, aligned knife-edge bearings 190 and 190A secured in the adjacent walls of the slot 104. When the mechanism is in the position shown in the drawings, i.e. when the axis of the pin 120 is contained in the same plane as the bottoms of the V-slots of the knife-edge bearings 134 and 190, 190A, the springs 133 will produce no turning movement on the lever 119 about the axis of the pin 120. If the handle 123 is moved up or down to an extent such as to disturb the alignment, then assuming the spring force remains constant, a progressively increasing movement will urge the lever 119 further from the central position of unstable equilibrium, in a direction depending upon the initial direction of the disturbance of equilibrium. The action of the leaf springs 133 is therefore such as to snap the lever into either of two extreme, angular positions corresponding to when the handle is lowermost and when the handle is uppermost.

A floating loaded member 135 is constituted by a disc 136 (which in the inoperative position of the mechanism is arranged to rest on the upper edge of the walls 113 of the chamber 109) and by a downwardly depending cylindrical wall 137 formed coaxially with the wall 113 and slightly spaced therefrom. The floating member 135 is flexibly connected to the outer wall of the boss 111 by means of an annular diaphragm 138 and inner and outer securing rings 139 and 140, the diaphragm 138 and the rings 139 and 140 being of similar construction to the diaphragm 49 and rings 58 and 59 described with reference to FIGURE 3 of the drawings.

An elongated weight-bearing rod 141 is secured in a central position to the disc 136 and extends upwardly along the longitudinal axis of the chamber 109. Six circular weight-bearing trays 142, 143, 144, 145, 146 and 147 are respectively centrally secured to the rod 141 at spaced positions thereon. Each of the trays 142 to 147 has associated therewith one of a set of six annular weight rests 148 to 153. Each of the weight rests 148 to 153 is mounted at diametrically opposed positions thereof on a separate pair of six pairs of elongated spindles 154 to 159, the pair of spindles secured to one of the rests slidably passing through the apertures formed in the remaining rests. As shown in the drawings, the pair of spindles 156 is secured to its rest 150 by means of grub screws 160. Each of the spindles 154 to 159 has a knob secured to its upper end, and the lower end of each spindle is located in a separate one of twelve bushed apertures 161 formed in the adjacent portion of the compression housing 108. Each of the spindles 154 to 159 is upwardly biased by means of a separate compression spring 162 which spring, at its lower end, effectively bears against the adjacent surface of the compression chamber housing 108, and at its upper end bears against a washer 163 captive on the respective spindle. The weight rests 148 to 154 have disposed thereon, or are arranged to receive, weights 164 to 169 of descending orders of magnitude. Upward movement of the weight rests 148 to 153 and their associated spindles 154 to 159 under the influence of the compression springs 162 is limited by the provision of annular stop plates 170 to 175 respectively disposed above and slightly spaced from the respective weight rests 148 to 153. The stop plates 170 to 175 are mounted with the aid of spacing sleeves on four supporting pillars 176, which pillars are secured at their lower ends to and around the periphery of the compression chamber housing 108. Suitable apertures are formed in the stop plates so as to permit the spindles 154 to 159 to pass slidably therethrough. Similarly a suitable aperture is formed in the uppermost stop plate 175 to permit the central rod 141 to pass therethrough.

A rotatable outer cylindrical shell 177 surrounds the spindles 154 to 159 and weight-bearing trays 142 to 147, and has its lower end disposed within an inwardly flanged portion of the shell 118. The rotatable shell 177 has its upper end sealed by a circular end plate 178, and rigidly mounted on this end plate is a turning knob 179. Depending from the lower face of the end plate 178, and at diametrically opposed positions thereon, is a pair of face cams 180 (only one of which can be seen in FIGURE 5), the arrangement being such that when the cams 180 engage the knobs of a pair of the pairs of spindles 154 to 159, that pair is forced downwards against the biasing effect of the associated compression springs 162.

Secured to the lower edge of the rotatable housing 177 is a rotatable ring 181 which is mounted within a channel formed between the upper portion 106 of the base member 110 and the adjacent surface of the compression chamber housing 108. An aperture 182 is formed in the shell 118, through which can be inspected the adjacent outer face 183 of the rotatable ring 181.

Six screw stops (only one of which, 184 is shown) are set into, and at equally spaced positions around, the ring member 181, the tip of each screw stop 184 serving to limit the upward displacement of the end 126 of the pivoted lever 119. The exact disposition of the tip of each screw 184 is adjustable, the screw stop itself being capable of being locked in position on the ring 181 by means of a lock-nut 185. The ring 181 is rotated by rotating the turning knob 179, so as to bring above the end 126 of the pivotal lever 119, any one of the six screw stops 184. The disposition of the screw stops on the ring 181 is so chosen that a particular screw stop 184 is located above the end 126 of the lever 119 when the cam 180 is in engagement with a particular pair of spindles 154 to 159. Thus each screw stop is associated with a particular weight and weight rest.

When the turning knob 179 has been rotated so that the cams 180 have forced downwards a particular pair of spindles, the weight rest associated with that particular pair of spindles will also be forced downwards so as to pass the adjacent weight tray, and thereby transfer the weight resting on the weight rest, on to the weight tray, thus loading the weight tray and in consequence the diaphragm 138 with a predetermined weight. This particular weight will continue to rest on the particular weight tray until the turning knob 179 has been so rotated as to cause the cams 180 to disengage that particular pair of depressed spindles. As shown in the drawings the weight rest 153 has been so depressed and its associated weight 169 is shown resting on the weight tray 147.

As a preliminary to operating the mechanism just described, the setting of each of the screw stops 184 is arranged so that when the particular weight associated with a particular screw stop loads the diaphragm, the lever 119 can be moved downwardly about the pivot pin 120 from the central position to such an extent, and only to such an extent, that the consequent compression of air in the chamber 109 due to the upward travel of the plunger 127 causes an upward displacement of the floating member 135 by a fixed and predetermined amount. Thus it is ensured that whatever the magnitude of the weight loading the diaphragm, the diaphragm is always displaced by the same amount. In this way the magnitude of the air pressure in the chamber 109 always includes a factor which relates to the resistance to displacement of the diaphragm, which factor is independent of the particular weight-loading of the diaphragm employed, and can therefore be allowed for in determining the precise magnitude of air pressure developed.

In operation of the mechanism and after the preliminary setting of the screw stops as has just been described, the capillary tube 117 is connected, for example, to the inlet pipe 60 of the apparatus shown in FIGURE 3. The handle 123 is displaced upwardly and the lever 119 is held in the position corresponding to this upward displacement of the handle 123, by the springs 133. As a result of this displacement of the handle 123 and the consequent downward movement of the lever 119, the plunger 127 moves into the enlarged end portion 110 of the chamber 109. The chamber 109 is in consequence in communication with the atmosphere. The loading of the floating member 135 with a particular chosen weight is effected by rotating the knob 179 until the cams 180 engage that pair of spindles, which is secured to that weight rest which has resting on it the particular chosen weight. As a result of the engagement of the cams 180 with the knob of this pair of spindles, these spindles are downwardly displaced and, as described above, the particular weight (as shown in the drawings the weight 169) is transferred on to the associated weight tray and loads the floating member 135 by the required amount. At the same time, that particular screw stop 184 associated with that particular weight is located above the end 126 of the lever 119. The outer face 183 of the sliding ring 181 has engraved around it the different weights with which the floating member 135 can be loaded. As a particular weight rests on its associated weight tray so details of that weight engraved on the face 183, are available for inspection by being disposed adjacent the aperture 182 formed in the shell 118. In this way, when it is desired to load the floating member 135 with a particular weight the knob 179 is rotated until details of the required weight engraved on the face 183 become visible through the aperture 182.

When the floating member 135 has been loaded with the required weight the handle 123 is downwardly depressed causing an upward movement of the lever 119, this upward movement continuing until the end of the lever 126 abuts against the tip of the screw stop 184, in which abutting position it is held by the spring 133. This upward movement of the lever 119 causes the plunger 127 to move upward in the chamber 109 so as to compress the air therein by an amount just sufficient to ensure that, with the indenter connected to the capillary 117, the weight-loaded floating member 135 comes to rest at a fixed predetermined position when the air pressures in chamber 109 and acting on the indenter attached to capillary 117 have become equalised. This pressure is thus directly related to the magnitude of the weight-loading of the floating member since the effect of the elasticity of the diaphragm 138 will be the same in all cases and can be allowed for.

Furthermore, the pressure will remain constant provided that there is no leakage of air from the system.

In this way, the mechanism just described is capable of producing and transmitting to indenter apparatus such as that described with reference to FIGURE 3 a substantially constant and accurately predetermined air pressure. Furthermore the accuracy obtainable in using the mechanism is enhanced by ensuring that, as far as possible, the degree of air compression is not dependent on the skill of the operator. Thus utilising the arrangement described with reference to FIGURES 5 to 7 of the drawings, pressure of air corresponding to various weight loadings can be successively generated by the mere rotation of a turning knob and the depression of a lever, and the magnitude of these pressures are directly related to the magnitudes of the weights loading a resiliently distortable diaphragm. The resistance to deformation of the diaphragm constitutes a constant factor in these pressures which is independent of the magnitude of the weight concerned.

Furthermore in view of the fact that these pressures arise out of the displacement of a weight loaded diaphragm, effects of heat dissipation on the magnitude of the pressure produced can be entirely neglected whilst the effects of variations in atmospheric pressure on the pressures of the compressed air are substantially negligible and can be ignored.

We claim:

1. In micro-hardness testing apparatus, a mechanism comprising a microscope objective adapted to form part of a microscope for measuring an indentation to be made in a test specimen, an indenter disposed adjacent to said objective and substantially on the optical axis thereof, flexible means interconnecting said indenter and objective and freely permitting movement of said indenter relative to said objective substantially only along said optical axis, and means for applying a predetermined load to said indenter to cause the same to produce an indentation in a test specimen maintained in fixed relation to said objective.

2. Mechanism as claimed in claim 1, wherein said indenter is mounted upon a transparent plate situated adjacent the objective, the plate being peripherally held in a carrier which surrounds the same, said objective having a housing which is spaced from but which surrounds said carrier, there being a flexible diaphragm inter-connecting the carrier and said housing, the diaphragm being such as freely to permit movement of said carrier in relation to said housing so that the indenter can move substantially only along the optical axis of the objective.

3. Mechanism as claimed in claim 1, wherein the means for applying a predetermined load to said indenter consists of electro-magnetic means.

4. Mechanism as claimed in claim 2, wherein said carrier has a coil effectively fixed thereto, and wherein means for producing a magnetic field are effectively fixed to said objective, the arrangement being such that said coil is located in said magnetic field and can be supplied with an electric current which is adjustable and which causes the coil, and hence the carrier to be displaced, whereby the indenter may make an indentation in a test specimen under the effect of a load determined by said current.

5. Mechanism as claimed in claim 4, wherein said coil is arranged for connection to a source of unidirectional current, the voltage of which can be adjusted, a capacitance being connected across the coil so as to ensure that the build-up of current in the coil is delayed and that therefore the indenter makes substantially impact-free contact with a specimen for indentation.

6. Mechanism as claimed in claim 1, wherein said means for applying a predetermined load to said indenter consists of pneumatic pressure means.

7. Mechanism as claimed in claim 2, wherein one side of the said diaphragm communicates with a chamber formed in said housing, said chamber being arranged for connection with a source of pneumatic pressure medium, the pressure of which is adjustably predetermined, the arrangement being such that when the pneumatic pressure medium is admitted to said chamber the diaphragm flexes and said carrier brings the indenter into engagement with a specimen, an indentation being produced by the application of a load to the indenter depending upon the pressure of the medium in said chamber and therefore the pressure applied to the one side of said diaphragm.

8. Mechanism as claimed in claim 7, wherein an additional diaphragm is provided disposed in like manner to the first-mentioned diaphragm but spaced therefrom in a direction parallel to the intended direction of movement of the indenter, said additional diaphragm being perforated so as to allow the pressure medium to pass therethrough and to act upon said one side of the first-mentioned diaphragm.

9. Mechanism as claimed in claim 7, wherein flow-restricting means is disposed in the path of the pneumatic pressure medium as between said source thereof and said chamber, the arrangement being such that during the build-up of the pressure in said chamber to the desired predetermined magnitude the flow of pressure medium to the chamber is restricted whereby a substantially impact-free contact can be established between the indenter and the specimen to be indented.

10. Mechanism as claimed in claim 7, wherein the source of pressure medium essentially consists of a body of the pressure medium confined so as to have floating on such body a weight of chosen magnitude whereby the pressure in said body of pressure medium is determined by the chosen magnitude of the weight, there being an outlet which permits supply of pressure medium from said body thereof.

11. Mechanism as claimed in claim 10, wherein said body of pressure medium is confined in a chamber which is expansible and contractible in the direction of the applied weight.

12. Mechanism as claimed in claim 11, wherein means are provided for manually compressing air, such means having an outlet communicating with the interior of said expansible chamber, there being valve means effective to open and close said outlet operable in response to movements of contraction or expansion of said chamber, the arrangement being such that upon operation of said means for compressing air the outlet therefrom can supply compressed air through said valve means to the said chamber to cause the latter to expand, and in so doing, to lift the weight so that the latter floats upon the chamber and loads the air therein, the resulting expansion of the chamber causing said valve means to close so that the pressure of air in the chamber then depends on the magnitude of the weight bearing thereon.

13. Mechanism as claimed in claim 12, wherein telltale means are arranged to produce an indication when said valve means is closed.

14. Mechanism as claimed in claim 12 wherein said means for compressing air is arranged so that it can continue to be operated after the valve means has closed, whereby on the side of said valve means remote from said chamber, there is a reserve of compressed air at a pressure slightly above that in said chamber when the valve means is closed, such reserve being available for replenishing said chamber when the valve means opens as the result of supplying air from said chamber for the operation of the indenter.

15. Mechanism as claimed in claim 10, wherein said body of pressure medium is confined in a chamber which can contract or expand in the direction of the line of action of a chosen weight which can load the chamber so as to tend to make the same contract, and wherein a plunger is arranged so that it can be moved towards or away from said chamber so as correspondingly to compress or decompress air confined therein, the arrangement being such that the plunger can be moved only with a predetermined length of compression stroke according to a particular chosen weight employed for loading the chamber whereby after such compression stroke has been effected the pressure of the air within said chamber will be raised to a point where the chosen weight loading the same floats upon the chamber at a particular location in which the chamber is expanded to a particular extent, the length of stroke being adjusted according to the different loading weights employed so as to ensure that said location is always substantially the same and that the resistance to expansion is therefore a constant.

16. Mechanism as claimed in claim 15, wherein said plunger is arranged to be operated by a lever device with which any chosen one of a number of stop means may be brought into cooperation so that according to which stop means is chosen, the movement of said lever will be restricted thereby to produce a particular length of compression stroke for the plunger upon operation of the lever device, and wherein said chamber can be loaded with any chosen one of a number of different weights at a time before the compression stroke commences, the arrangement being such that the choice of a particular loading weight ensures that the stop means appropriate thereto will be brought into cooperation with said lever device.

17. Mechanism as claimed in claim 16, wherein said chamber has a wall portion which is adapted to move in the one direction or the other with respect to the remainder of the chamber so as to produce the expansion or contraction of the chamber, and wherein said wall portion has an upright support extending therefrom and passing through a series of weights of different magnitudes, said weights being individually supported upon weight rests which normally hold the weights so that they will not effectively engage said upright support, the arrangement being such that when said chamber is caused to expand and said wall portion is therefore displaced, the weight rest of a particular chosen weight can be moved in a direction opposite that in which the upright support moves, whereby the latter will engage the weight associated with the chosen weight rest and will lift the weight from its weight rest thereby loading the upright support with the chosen weight.

18. Mechanism as claimed in claim 17, wherein the individual weight rests with their weights are normally biased to occupy positions where they will lie out of the range of movement of said upright support, and wherein cam means are arranged so that by turning said cam means the individual weight rests can be selectively depressed against the action of the bias to bring any chosen one of the weight rests and the associated weight into the range of movement of said upright support, and wherein the stop means for co-operation with said lever device are arranged so as to be displaceable according to the displacements of said cam means so that when a particular weight and weight rest are chosen to be depressed against the associated bias, a stop means appropriate for the weight in question is displaced to the positon where such stop means co-operates with the lever device.

References Cited in the file of this patent

UNITED STATES PATENTS

| | | |
|---|---|---|
| 337,431 | Pintsch | Mar. 9, 1886 |
| 392,447 | Meyer | Nov. 6, 1888 |
| 2,216,943 | Hanemann | Oct. 8, 1940 |
| 2,305,760 | Bernhardt | Dec. 22, 1942 |
| 2,355,411 | Bernhardt et al. | Aug. 8, 1944 |
| 2,803,130 | Bernhardt | Aug. 20, 1957 |
| 3,028,745 | Muires | Apr. 10, 1962 |